United States Patent [19]
Chow et al.

[11] Patent Number: 5,452,157
[45] Date of Patent: Sep. 19, 1995

[54] SPRING MEMBER FOR HUB ASSEMBLY

[75] Inventors: Min-Chan J. Chow, San Jose; Ramgopal Battu, Canoga Park; Jeffrey L. Wang, San Jose, all of Calif.

[73] Assignee: Seagate Technology, Inc., Scotts Valley, Calif.

[21] Appl. No.: 251,694

[22] Filed: May 31, 1994

[51] Int. Cl.[6] .......................................... G11B 17/08
[52] U.S. Cl. ............................ 360/98.08; 360/99.12
[58] Field of Search ...................... 360/98.08, 99.12

[56] References Cited

U.S. PATENT DOCUMENTS

| | | | |
|---|---|---|---|
| 4,764,828 | 8/1988 | Gollbach | 360/98 |
| 4,864,443 | 9/1989 | Peterson | 360/99.12 |
| 4,945,432 | 7/1990 | Matsudaira et al. | 360/98.02 |
| 5,101,306 | 3/1992 | Johnson | 360/99.08 |
| 5,136,450 | 8/1992 | Moir | 360/135 |

FOREIGN PATENT DOCUMENTS

| | | |
|---|---|---|
| 0339765 | 2/1989 | European Pat. Off. |
| 3816975A1 | 5/1989 | Germany |
| 60-193156 | 10/1985 | Japan |
| WO93/06599 | 9/1991 | WIPO |

OTHER PUBLICATIONS

IBM Technical Disclosure Bulletin, "Disk Stack Clamping Means", vol. 32, No. 12, May 1990, pp. 365–367.
IBM Technical Disclosure Bulletin, "Disk Pack Assembly Design", vol. 32, No. 6A, Nov. 1989, p. 129.

*Primary Examiner*—A. J. Heinz
*Attorney, Agent, or Firm*—Westman, Champlin & Kelly

[57] ABSTRACT

A hub assembly in a disc drive includes a hub rotatable about an axis. The hub has a first axial end and a second axial end. A plurality of hub mounted elements are disposed about the hub, including a support member connected to the second axial end of the hub, a disc, a clamp which frictionally engages the hub, and a spring located axially between the clamp and the support member. The clamp and the support member exert opposing axial forces on the disc to hold the disc for rotation with the hub. The spring includes a first axial surface and a second axial surface opposite the first axial surface. The first and second axial surfaces are non-planar to provide resilience in the axial direction.

18 Claims, 2 Drawing Sheets

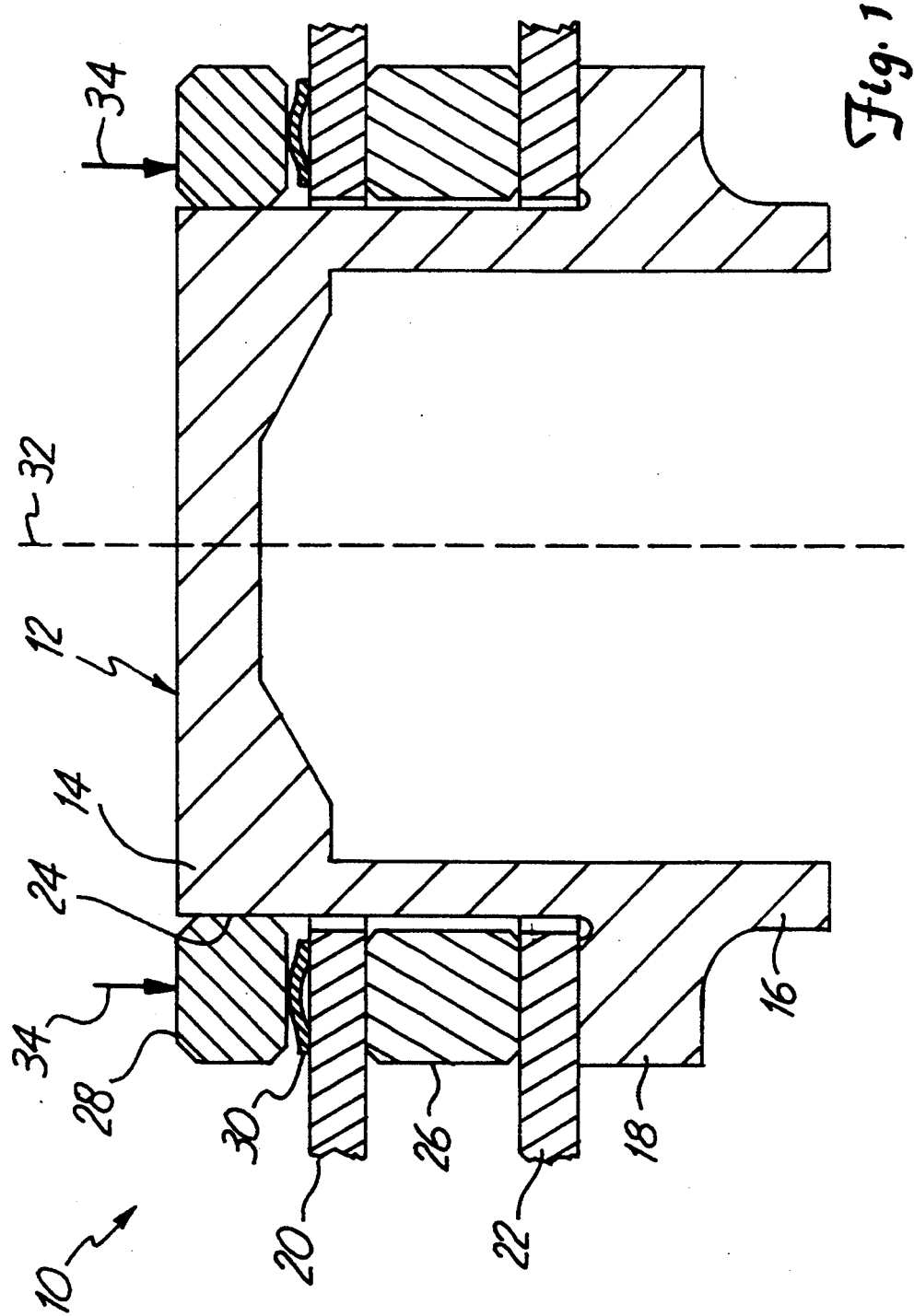

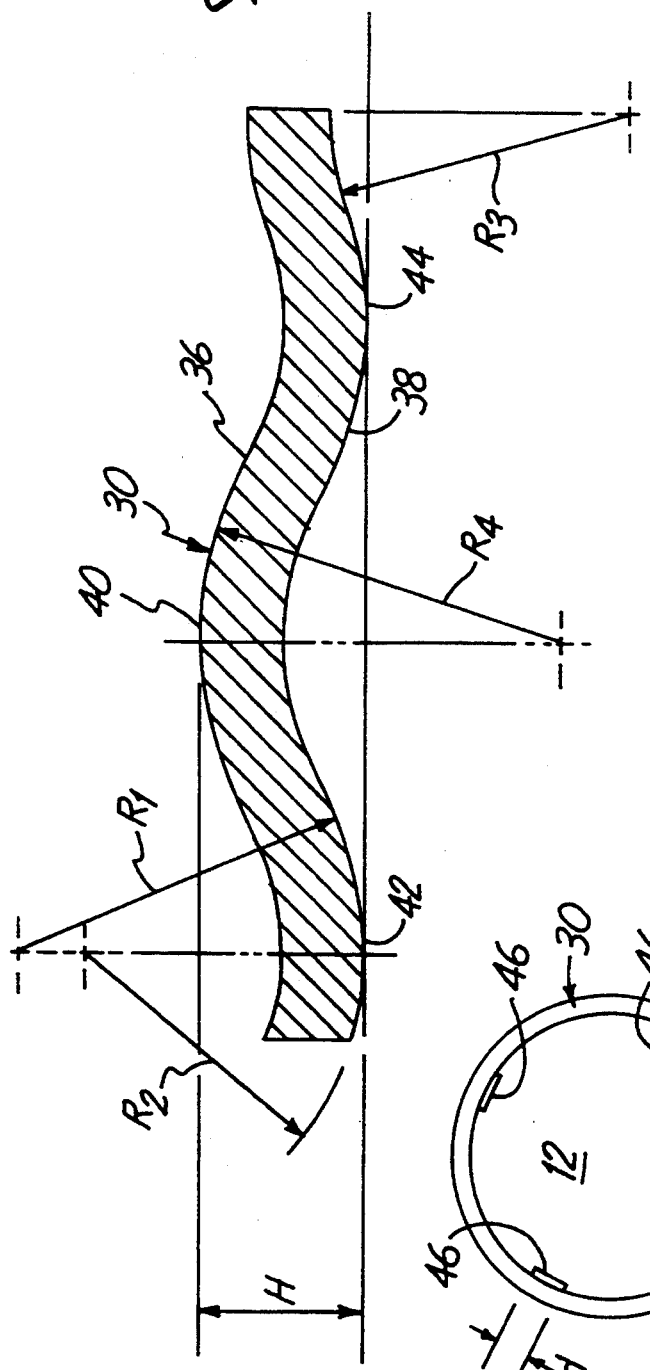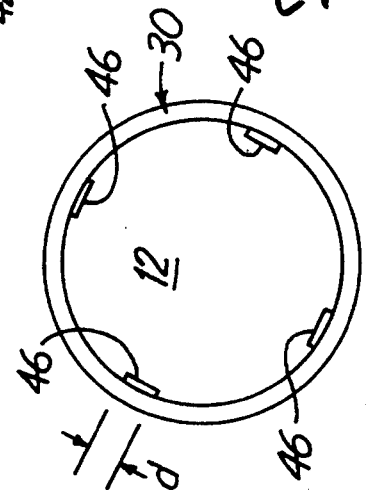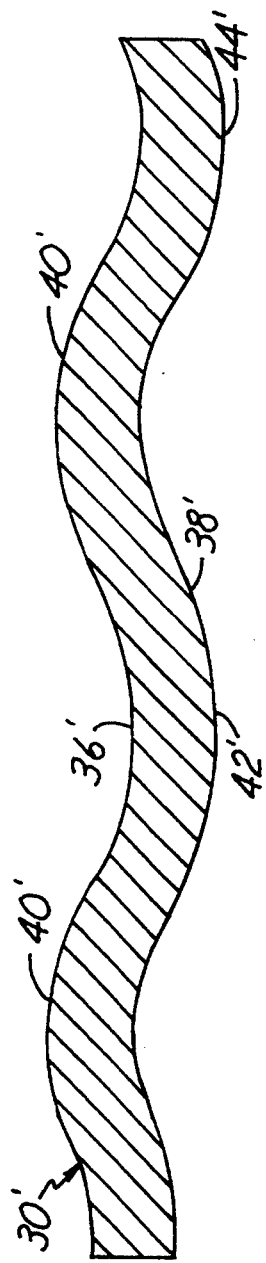

SPRING MEMBER FOR HUB ASSEMBLY

BACKGROUND OF THE INVENTION

The present invention deals with disc drives. More particularly, the present invention deals with a device for retaining an axial load in a hub assembly of a disc drive.

A typical disc drive includes one or more magnetic discs mounted for rotation on a hub or spindle. Where more than one magnetic disc is used, the discs are spaced apart from one another axially along the hub by spacers mounted between the discs. Conventional hubs typically include a flange portion which extends from one of the axial ends of the hub. The discs and spacers are placed concentrically about the hub and are supported by the flange portion of the hub. The plurality of magnetic discs and the spacers are clamped down onto the flange portion of the hub using a clamp which is placed on the axial end of the hub, opposite the flange. Thus, the discs and spacers are all clamped to the hub for rotation with the hub about an axis of rotation generally defined by the radial center of the hub.

A typical magnetic disc drive also includes a transducer supported by a hydrodynamic air bearing which flies above each magnetic disc. The transducer and the hydrodynamic air bearing are collectively referred to as a data head. A drive controller is conventionally used for controlling the disc drive system based on commands received from a host system. The drive controller controls the disc drive to retrieve information form the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on the magnetic disc, and consequently represented in the read signal provided by the data head.

As industry pressure requires disc drives to be reduced in size, the axial height of the stack assembly, and consequently the axial height of the entire disc file, becomes critical. In past systems, the clamp used to hold the discs about the hub was located above the hub and screwed onto the hub with screws running in the axial direction. However, since the axial height of the stack assembly has become critical, the clamp and the screws used to fasten the clamp to the hub take up an undesirable amount of axial space.

Therefore, a heat shrink clamp was developed. Such a clamp is described in greater detail in U.S. Pat. No. 4,639,802. Such clamps typically include a clamp ring which has an inner diameter that is slightly smaller than the outer diameter of one axial end of the hub. The clamp ring is responsive to thermal energy and expands when thermal energy is applied to it and contracts when thermal energy is removed from it. Therefore, to assemble the clamp ring onto the hub, the clamp ring is first heated, thereby expanding it such that the inner diameter of the clamp ring is slightly larger than the outer diameter of the hub. The clamp ring is then placed about the hub and allowed to cool to establish a frictional or interference fit with the outer surface of the hub.

After the plurality of discs and spacers are arranged about the hub, and after the clamp is placed on the hub, the assembly is subjected to an axial load, referred to as the "preload". Under the preload, the clamp ring is allowed to cool and form its frictional fit with the hub before the preload is removed. The clamp ring retains a portion of the preload and thus clamps the spacers and the magnetic discs to the flange located at the second axial end of the hub.

A major concern which arises in designing a magnetic disc hub assembly is the manner in which the magnetic discs are clamped together. The discs must be clamped with sufficient axial force to prevent radial movement of the discs which could result from unbalanced rotational forces, thermal expansion, or shock or impact loads during product shipping. To ensure that there is a minimum radial shifting of the discs, the stack of discs must be subjected to a specified clamping force which is exerted by opposing axial forces applied to the discs from the clamp ring and the flange.

The clamp ring is usually made of the same material as the hub. Once the preload is removed, the clamping force exerted by the clamp ring is relaxed. There are a number of reasons for the relaxation of the clamping force. For example, when the preload is applied, the discs are slightly compressed. When the preload is removed, both the hub and the clamp ring are slightly stretched in the axial direction by the compressed discs which tend to resume their original shape after the preload is removed. If the clamping force is relaxed beyond the minimum force required to prevent radial disc movement, the hub assembly will not meet specification and must be discarded.

In addition, the clamping force in traditional hub assemblies can vary with temperature changes in the air surrounding the hub assembly. While the clamp ring and the hub are made of the same material, the discs and the hub are traditionally not made of the same material. Thus, there is typically a mismatch between the thermal expansion coefficients of the discs and the hub. When the air surrounding the hub assembly undergoes a significant temperature change, the mismatch in expansion coefficients can result in a substantial change in the clamping force clamping the discs to the flange. This can cause the clamping force to drop below the minimum force requirement for preventing disc radial movement on the hub assembly.

While some attempts have been made at introducing a resilient mechanism into the hub assembly (such as that set out in U.S. Pat. No. 5,006,942) such devices can be expensive and inefficient in retaining preload. Thus, there is a continuing need for devices in the hub assembly which provide a mechanical buffer for storing and retaining physical strain exerted by the preload in order to compensate for loss of preload by stretching of the hub and clamp ring, and by thermal expansion differences between the hub material and the material used in making the discs.

SUMMARY OF THE INVENTION

A hub assembly in a disc drive includes a hub rotatable about an axis. The hub has a first axial end and a second axial end. A plurality of hub mounted elements are disposed about the hub, including a support member connected to the second axial end of the hub, a disc, a clamp which frictionally engages the hub, and a spring located axially between the clamp and the support member. The clamp and the support member exert opposing axial forces on the disc to hold the disc for rotation with the hub. The spring includes a first axial surface and a second axial surface opposite the first axial surface. The first and second axial surfaces are non-planar to provide resilience in the axial direction.

BRIEF DESCRIPTION OF THE DRAWINGS

FIG. 1 is a side sectional view of a hub assembly according to the present invention.

FIG. 2 is a side sectional view of a spring element according to the present invention.

FIG. 3 is a top plan view of the spring element shown in FIG. 2.

FIG. 4 is a second embodiment of a spring member according to the present invention.

DETAILED DESCRIPTION OF THE PREFERRED EMBODIMENTS

FIG. 1 shows a hub assembly 10 according to the present invention. Hub assembly 10 includes a hub 12 having a first axial end 14 and a second axial end 16. A support flange 18 is disposed generally at the second axial end 16 of hub 12. In the preferred embodiment, the support flange 18 is integrally formed with hub 12.

Hub assembly 10 also includes first and second discs 20 and 22, respectively. Discs 20 and 22 are disposed about an outer periphery 24 of hub 12. Hub assembly 10 further includes an annular spacer 26, heat shrink clamp 28, and spring member 30, all of which are coaxially disposed about the outer periphery 24 of hub 12.

Hub 12 is mounted for rotation about axis 32 which is generally defined by the axial center of hub 12. Heat shrink clamp 28 is a thermally responsive clamp, typically formed of the same material as hub 12. During assembly, discs 20 and 22 are placed about the outer periphery 24 of hub 12 and are axially spaced apart from one another by annular spacing ring 26. Spring member 30 is then placed about the outer periphery 24 of hub 12. Heat shrink clamp 28 preferably has an inner diameter which is slightly smaller than the outer diameter of the periphery 24 of hub 12. Heat shrink clamp 28 expands when thermal energy is applied thereto, and contracts when thermal energy is removed therefrom. During assembly, heat shrink clamp 28 is heated so that its inner diameter expands to a dimension slightly larger than the outer diameter of periphery 24 of hub 12. Heat shrink clamp 28 is then placed about the outer periphery 24 of hub 12 and an axial load is applied to the hub assembly 10 in the direction indicated by arrows 34.

Spring member 30 is formed of an annular metal ring which has first and second generally opposing axial surfaces which are non-planar. In the preferred embodiment, spring member 30 is formed of stainless steel. Thus, the non-planar contour of the surfaces of spring member 30 cause spring member 30 to have resilience in the axial direction. Under the application of the preload in the directions of arrows 34, spring member 30 is somewhat compressed. The preload is held in place until thermally responsive clamp 28 cools and forms a frictional fit with the outer periphery 24 of hub 12. The preload is then removed. The resilience of spring member 30 retains a portion of the preload in hub assembly 10.

Axial stretching of the hub 12 can occur because, under the preload, discs 20 and 22 are slightly axially compressed. However, when the preload is removed, the discs 20 and 22 tend to return to their original shape. This causes hub 12 to stretch. However, because a portion of the preload is retained in resilient member 30, a sufficient axial load is still applied to, or exerted against, discs 20 and 22 even though hub 12 undergoes some axial stretching.

In addition, because the materials of discs 20 and 22 and the material of hub 12 is different, the coefficients of thermal expansion typically differ. A sudden change in air temperature of the air surrounding hub assembly 10 can cause expansion or contraction of discs 20 and 22 or hub 12 at different rates. Again, because spring member 30 retains a great portion of the preload applied during assembly, a sufficient axial load is still applied to discs 20 and 22 even though radial expansion or contraction occurs in hub assembly 10.

FIG. 2 is a greatly enlarged cross-sectional view of spring member 30 according to the present invention. Spring member 30, as shown in FIG. 2, has a first axial surface 36 and a second axial surface 38. In the preferred embodiment, the axial surfaces 36 and 38 are non-planar, are parallel, and assume the shape of a sine wave. Also, in the preferred embodiment, axial surface 36 of spring member 30 has a first contact portion 40 which contacts clamp ring 28. The second axial surface 38 of spring member 30 has a plurality of contact portions 42 and 44 which are radially spaced from the first contact portion 40 on axial surface 36. Contact portions 42 and 44 are radially spaced from one another and, in the preferred embodiment, contact disc 20. While it should be noted that spring member 30 can be placed with any orientation, at any point between clamp ring 28 and flange 18, the preferred embodiment, as shown in FIG. 1, includes spring member 30 between clamp ring 28 and disc 20 in a two-disc system. The placement of spring member 30 between clamp ring 28 and disc 20 prevents the heated clamp ring 28 from directly contacting the surface of disc 20. This alleviates problems caused by direct contact between heated clamp ring 28 and disc 20, such as disc warping.

In the embodiment shown in FIG. 2, the contact portions 42 and 44 are formed by troughs in the sine wave contour of axial surface 38. The following dimensions are preferred for a two-disc system having 2 ½ inch diameter discs. The radius of curvature of the troughs at point $R_1$ is approximately 0.021 inches. In addition, the radius of curvature of the contours at $R_2$ is approximately 0.017 inches and the radius of curvature $R_3$ is approximately 0.018 inches. The radius of curvature of axial surface 36 at radius $R_4$ is approximately 0.022 inches. In addition, contact portions 42 and 44 have a radial dimension from axis 32 of 0.441 inches and 0.403 inches, respectively. Contact portion 40 is radially spaced from axis 32 by 0.422 inches. Finally, in the preferred embodiment, the overall axial height of the crest forming contact portion 40 is approximately 0.010 inches.

FIG. 3 is a top plan view of clamp ring 30 according to the present invention. FIG. 3 shows that clamp ring 30 has a plurality of tabs 46 which extend radially inward and engage the outer periphery 24 of hub 12. Tabs 46 engage periphery 24 to accomplish centering of spring member 30 about hub 12. Tabs 46 have a circumferential dimension d which is approximately 0.100 inches. The overall radial width of spring member 30 (excluding tabs 46) is preferably 0.048 inches and the radial width of tabs 46 is preferably 0.008 inches.

Spring member 30 is preferably formed of stainless steel 302 which is approximately 0.005 inches thick, ¾ hard. Of course, the particular material and the dimensions of material for a particular application will depend on the desired spring constant necessary to retain the desired amount of axial preload in the hub assembly. This will change with the number of discs and other variables which affect the axial load supported by the hub assembly 10.

FIG. 4 shows a second embodiment of a spring member 30' according to the present invention. Spring member 30' is similar to spring member 30 except that a plurality of crests 40' and troughs 42' and 44' in the sine wave contour of spring member 30' are provided in axial surfaces 36' and 38'.

While any contour can be used which provides radially spaced contact portions, the sine wave configuration has been observed to work particularly well. In addition, while any number of crests and troughs can be used in forming spring members 30, 30' introducing additional crests and troughs into the same radial dimension of spring member 30 causes tolerances to be difficult to control. Further, the crest 40 can be biased to one radial side or the other of spring member 30. However, by placing crest 40 in the center of troughs 42 and 44, and by spacing troughs 42 and 44 radially as far apart as possible, spring member 30 has been observed to obtain a high degree of axial resilience which is particularly useful in retaining the axial preload in hub assembly 10. The high axial resilience can accommodate for, and reduce, the effects of disc distortion (typically in the form of waves) in the circumferential direction.

Thus, the present invention provides a compressible spring mechanism which essentially acts as a mechanical buffer for storing a certain amount of physical strain induced by the axial preload applied during assembly of hub assembly 10. When the axial preload is removed, only a portion of the physical strain stored in spring member 30 is released to compensate for the stretch of hub 12 and clamp ring 28. Thus, a certain portion of the preload is retained by the residual compression left in spring member 30. This retained preload is significant in reducing the rate of change of disc clamping force with air temperature.

A further advantage of spring member 30 is that it has been observed to reduce disc coning under the applied preload. This improves head flying height and read/write performance in the system.

The present invention also provides ease of fabrication. Spring member 30 can be fabricated with a simple sheet-metal stamping process which has a significantly reduced cost over machining processes used in the past.

Finally, the geometry of spring member 30 is such that no orientation restriction is required. In other words, spring member 30 can be placed at any point between clamp ring 28 and flange 18, and it can either be placed with the crests facing upward or downward, whichever is convenient.

Although the present invention has been described with reference to preferred embodiments, workers skilled in the art will recognize that changes may be made in form and detail without departing from the spirit and scope of the invention.

What is claimed is:

1. A hub assembly in a disc drive, comprising:
    a hub rotatable about an axis and having a first axial end and a second axial end; and
    a plurality of hub mounted elements disposed about the hub, the plurality of hub mounted elements comprising:
        a support member connected to the second axial end of the hub;
        a disc disposed about the hub;
        a clamp disposed about the hub and frictionally engaging the hub, the clamp and the support member exerting opposing axial forces on the disc to hold the disc for rotation with the hub; and
        a spring disposed about the hub and located axially between the clamp and the support member, the spring including a first axial surface and a second axial surface opposite the first axial surface, the first and second axial surfaces being non-planar, wherein the first axial surface has a first element contact portion contacting one of the plurality of hub mounted elements and the second axial surface has a plurality of second element contact portions contacting a second of the plurality of hub mounted elements, the second contact portions being radially spaced from one another.

2. The hub assembly of claim 1 wherein the first axial surface is generally parallel to the second axial surface.

3. The hub assembly of claim 1 wherein the hub and the support member are formed integrally with one another.

4. The hub assembly of claim 1 wherein the first and second axial surfaces generally have a sine wave shape wherein the first element contact portion comprises one of a crest and trough of the sine wave shape and wherein each of the plurality of second element contact portions comprises another of the crest and trough of the sine wave shape.

5. The hub assembly of claim 4 wherein the spring is mounted axially between the clamp and the disc such that the first element contact portion contacts the clamp and the plurality of second element contact portions contact the disc.

6. The hub assembly of claim 5 and further comprising:
    a plurality of discs mounted about the hub and axially spaced from one another.

7. The hub assembly of claim 1 wherein the spring comprises:
    a stamped ring having a curved contour along the first and second axial surfaces.

8. A hub assembly in a disc drive, comprising:
    a hub, rotatable about an axis, the hub having a periphery, a first axial end and a second axial end;
    a support member disposed at the second end of the hub;
    a disc disposed about the periphery of the hub and supported by the support member;
    a clamp disposed generally about the first end of the hub, the clamp clamping the disc to the support member for rotation with the hub; and
    spring means, disposed about the periphery of the hub and located axially between the clamp and the support member, for providing axial resilience between the clamp and the support member, wherein the spring means has a first axial surface and a second axial surface opposite to the first axial surface, with the second axial surface having a plurality of radially spaced contact portions contacting one of the support member, disc and clamp.

9. The hub assembly of claim 8 wherein the spring means comprises:

a ring disposed about the hub, with the first and second axial surfaces being non-planar.

10. The hub assembly of claim 9 wherein the first axial surface has a first contact portion contacting one of the support member, the disc and the clamp which is other than that contacted by the second contact portions.

11. The hub assembly of claim 10 wherein the plurality of second contact portions are radially spaced from the first contact portion.

12. The hub assembly of claim 11 wherein the first and second axial surfaces are generally parallel and have a sine wave shape wherein the first contact portion comprises one of a crest and trough of the sine wave shape and wherein each of the plurality of second contact portions comprises another of the crest and trough of the sine wave shape.

13. The hub assembly of claim 12 wherein the ring is mounted axially between the clamp and the disc such that the first contact portion contacts the clamp and the plurality of second contact portions contact the disc.

14. The hub assembly of claim 13 and further comprising:

a plurality of discs mounted about the hub and axially spaced from one another.

15. The hub assembly of claim 14 wherein the hub and the support member are formed integrally with one another.

16. A hub assembly in a disc drive, comprising:

a hub rotatable about an axis, the hub having a first axial end and a second axial end with a support flange disposed generally at the second axial end;

a first disc disposed about the hub and supported by the support flange;

a second disc disposed about the hub;

spacer means, disposed about the hub, for axially spacing the first disc from the second disc;

a clamp coupled to the hub proximate the first axial end of the hub, the clamp and the support exerting generally opposing axial forces on the first and second discs and the spacer means; and a spring disposed about the hub and located axially between the clamp and the support flange, the spring comprising a ring having first and second axial surfaces contoured such that the first and second axial surfaces are non-planar with the first axial surface having a first contact portion contacting one of the support flange, the first and second discs, the spacer means and the clamp, and the second axial surface having a plurality of radially spaced second contact portions contacting another of the support flange, the first and second discs, the spacer means and the clamp, the first and second contact portions being radially spaced from one another.

17. The hub assembly of claim 16 wherein the first axial surface has a plurality of first contact portions.

18. The hub assembly of claim 17 wherein the first and second axial surfaces are generally parallel and have a sine wave shape wherein each of the first contact portions comprises one of a crest and trough of the sine wave shape and wherein each of the plurality of second contact portions comprises another of the crest and trough of the sine wave shape.

* * * * *